United States Patent
Nagai et al.

(10) Patent No.: US 7,224,171 B2
(45) Date of Patent: May 29, 2007

(54) METHOD FOR DETECTING OUTPUT CURRENT OF INVERTER AND DEVICE THEREFOR

(75) Inventors: Masahiko Nagai, Nagano (JP); Hiroyuki Hanaoka, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 86 days.

(21) Appl. No.: 11/091,317

(22) Filed: Mar. 28, 2005

(65) Prior Publication Data

US 2005/0219880 A1 Oct. 6, 2005

(30) Foreign Application Priority Data

Mar. 31, 2004 (JP) .............................. 2004-108494

(51) Int. Cl.
 *G01R 31/08* (2006.01)
 *G01R 19/00* (2006.01)
(52) U.S. Cl. .................................... 324/522; 324/76.11
(58) Field of Classification Search ................ 324/522, 324/76.11
See application file for complete search history.

(56) References Cited

U.S. PATENT DOCUMENTS

| | | | |
|---|---|---|---|
| 5,497,095 A * | 3/1996 | Ueyama et al. ............. | 324/537 |
| 6,330,174 B1 | 12/2001 | Yeah | |
| 6,496,394 B2 * | 12/2002 | Hanaoka et al. ............. | 363/71 |
| 6,496,397 B2 | 12/2002 | Sakai et al. | |
| 6,556,458 B2 | 4/2003 | Ohmura et al. | |
| 6,671,191 B2 | 12/2003 | Hanaoka et al. | |
| 6,900,643 B2 * | 5/2005 | Deng et al. ................. | 324/522 |

* cited by examiner

*Primary Examiner*—Andrew H. Hirshfeld
*Assistant Examiner*—Amy He
(74) *Attorney, Agent, or Firm*—Rankin, Hill, Porter & Clark LLP

(57) ABSTRACT

An inverter output current detection device is provided which can calculate an output current of an inverter easily by using a low-performance calculating device without lowering a calculation accuracy. A current $ic'$ equivalent to a capacitor current $ic$ is digitally calculated according to a predetermined expression. This expression is $$ic' = V \times \omega 0 \times C \times [\cos \text{Wavedata}] \times K,$$

where V is an effective value or average value of an output voltage vo, C is a capacitance of a capacitor C, $\omega 0$ is an angular frequency of the output voltage, and K is a value obtained by multiplying a detection ratio for detecting the output voltage vo, a conversion ratio for converting an analog value into a digital value, and a conversion ratio for converting the effective value or average value V into a maximum value.

8 Claims, 1 Drawing Sheet

METHOD FOR DETECTING OUTPUT CURRENT OF INVERTER AND DEVICE THEREFOR

BACKGROUND OF THE INVENTION

The present invention relates to a method and a device for detecting an output current of an inverter by calculation therefor.

FIG. 2 shows an example of an output circuit in a conventional inverter. Generally, an output of an inverter circuit used in an uninterruptible power supply is filtered by an LC filter made up of a reactor L and a capacitor C before being output. A control of the inverter requires a detection of an output current iL of the inverter circuit. For this purpose a current detector is provided at a position 101 in FIG. 2. When there is a need to detect an output current (load current) io of the inverter, a current detector is provided at a position 102 in FIG. 2.

When both of the output current iL of the inverter circuit and the load current io of the inverter need to be detected, two detectors are required. For a reduction of size and cost, some inverters use the output current iL of the inverter circuit rather than detecting the output current io. It is noted, however, that since a capacitor current ic flows through the capacitor C, io is not equal to iL. Because io=iL−ic, there is an error. If io>>ic, the effect of this error on the phase is small. But as the magnitude of the capacitor current ic becomes closer to that of the output current io, not only the magnitude of this error but also the adverse effect of the error increase.

According to a general theory, the capacitor current ic can be obtained according to the expression (1) as follows.

$$ic = C \times dvo/dt \quad (1)$$

where C is a capacitance of the capacitor and vo is an output voltage (=voltage across the capacitor). As can be seen from this expression, the capacitor current ic can be obtained by differentiating the output voltage vo. Since the output voltage vo is a sinusoidal wave and differentiated to calculate the capacitor current ic, it is seen that the capacitor current ic leads the output voltage vo by 90 degrees in phase. By calculating the expression (1) using a CPU (central processing unit) or a DSP (digital signal processor), the capacitor current ic can be obtained from the output voltage vo. However, differentiating the output voltage vo using a low-performance CPU or DSP is technically difficult.

An object of this invention is to provide a method for detecting inverter output current and a device capable of calculating the output current of an inverter easily using a low-performance calculating device without lowering a calculation accuracy.

SUMMARY OF THE INVENTION

The present invention is intended to improve an inverter output current detection method for an inverter, wherein the inverter has an LC filter made up of a reactor and a capacitor on an output side of an inverter circuit and supplies a load with a terminal voltage of the capacitor as an output voltage, wherein the detection method detects as an output current a current io obtained by subtracting a capacitor current ic flowing through the capacitor from a reactor current iL flowing through the reactor.

With this invention, the output voltage vo is detected for obtaining its effective value or average value V. A cosine wave digital data [hereinafter referred to as cos Wave Data] is obtained by advancing by 90 degrees a phase of an inverter sine wave data used to obtain the output voltage vo. The cos WaveData may be obtained in advance and stored in a memory means. Then, in this invention, a current ic' equivalent to the capacitor current ic is digitally calculated by the following expression:

$$ic' = V \times \omega 0 \times C \times [\cos \text{WaveData}] \times K$$

where C is a capacitance of the capacitor C and ω0 is an angular frequency of the output voltage. The angular frequency ω0 can be obtained by calculating depending on the output voltage or stored in a memory means in advance. In the above expression, K is a value obtained by multiplying a detection ratio for detecting the output voltage vo, a conversion ratio for converting an analog value to a digital value and a conversion ratio for converting the effective value or average value V into a maximum value. The current ic' thus obtained is used to calculate an output current io=iL−ic' by taking the current ic' as the capacitor current ic. Since the above expression can be calculated by multiplication alone, the calculation can be performed easily even by a low-performance CPU or DSP. There is no problem of degraded calculation accuracy.

The inverter output current detection device of this invention comprises: a voltage calculation means for detecting the output voltage vo and calculating its effective value or average value V; an angular frequency calculation means for obtaining an angular frequency ω0 of the output voltage vo from the output voltage; a data memory means for storing in advance the cos WaveData obtained by advancing by 90 degrees a phase of inverter sine wave data used to obtain the output voltage vo; and a capacitor current calculation means for digitally calculating a current ic' equivalent to the capacitor current ic according to the above expression.

With this invention, since a current equivalent to the capacitor current can be calculated in real time by multiplication operations alone, the output current can be calculated easily even with a low-performance CPU or DSP without degrading a calculation accuracy.

DETAILED DESCRIPTION OF PREFERRED EMBODIMENTS

Figure 1:
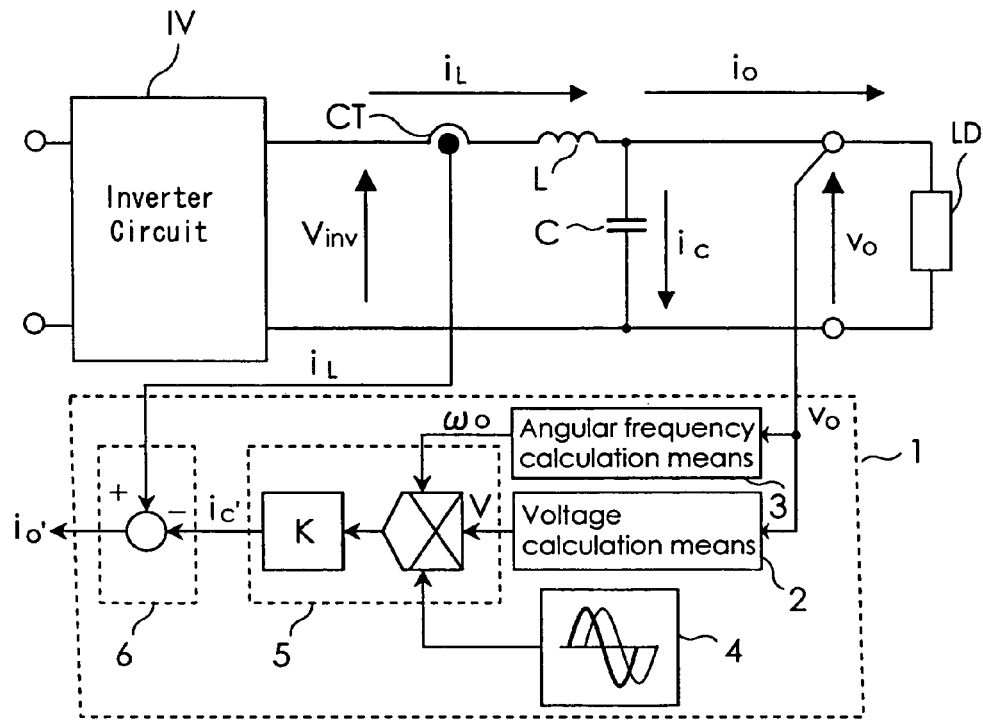
FIG. 1 shows an example configuration of an output current detection device as one embodiment of this invention.
Figure 2:
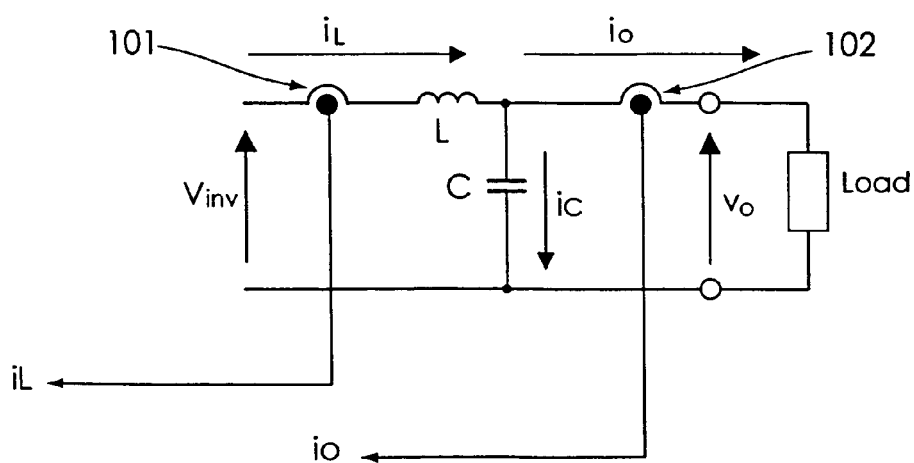
FIG. 2 is a schematic circuit diagram for a conventional output current detection method.

By referring to the accompanying drawings, an example embodiment of an output current detection device that implements an inverter output current detection method of this invention will be described. An embodiment of the inverter output current detection method will also be explained. FIG. 1 shows an example configuration of an output current detection device according to this invention. As with the conventional device of FIG. 2, the embodiment of this invention has at the output side of an inverter circuit IV and an LC filter made up of a reactor L and a capacitor C. A reactor current iL flowing through the reactor L is detected by a current transformer CT. A voltage across the capacitor C is supplied to a load LD as an output voltage vo. Reference number 1 represents an output current detection device that calculates an output current io by subtracting a current ic' equivalent to a capacitor current ic flowing through the capacitor C from the reactor current iL in the inverter. The output current detection device 1 comprises a voltage calculation means 2 for detecting the output voltage vo and calculating its effective value or average value V, an angular frequency calculation means 3 for calculating an angular frequency ω0 of the output voltage depending on the output voltage vo, a data memory means 4 for storing in advance cos WaveData that is obtained by advancing by 90 degrees the phase of an inverter sine wave data used to determine the output voltage vo, a capacitor current calculation means 5 for calculating the current ic' equivalent to the capacitor current ic by digitally calculating an expression described later, and an output current calculation means 6 for calculating, an output current io by subtracting the current ic' from the reactor current iL.

The capacitor current calculation means 5 digitally calculates the current ic' equivalent to the capacitor current ic according to expression (2) as follows.

$$ic' = V \times \omega 0 \times C \times [\cos \text{WaveData}] \times K \quad (2)$$

In the above expression (2), C is a capacitance of the capacitor C, ω0 is an angular frequency, and K is a coefficient. To calculate the above expression, the voltage calculation means 2 detects the output voltage vo and obtains its effective value or average value V. The output voltage vo may be detected by a potential transformer or potential divider. The effective value or average value is calculated by a known effective value calculation technique or average value calculation technique. The angular frequency calculation means 3 has a circuit to transform the frequency of the output voltage vo into a DC value. In FIG. 1, the angular frequency calculation means 3 is a so-called "f-V converter" that transforms the frequency of the output voltage vo into a DC value. In an uninterruptible power supply, since the frequency fo of the output voltage vo is 50 Hz or 60 Hz, the angular frequency calculation means 3 may be replaced with an angular frequency memory means. Therefore, if the device is used in Japan where the power frequency is already known, ω0 may be set to a fixed value corresponding to 50 Hz or 60 Hz. However, when the output voltage vo has big frequency variations, the error becomes large making it necessary to perform the "f-V conversion" as in this embodiment.

The data memory means 4 stores in advance the cos WaveData which is obtained by advancing through 90 degrees the phase of the inverter sine wave data for obtaining the output voltage vo. The capacitor current calculation means 5 multiplies the effective value or average value V of the output voltage vo calculated by the voltage calculation means 2, the angular frequency ω0 calculated by the angular frequency calculation means 3, the capacitance of the capacitor, and the cos WaveData stored in the data memory means 4. The capacitor current calculation means 5 then multiplies the resultant value and the coefficient K.

The coefficient K is a value obtained by multiplying a detection ratio used for detecting the output voltage vo, a conversion ratio used for transforming an analog value into a digital value, and a conversion ratio for converting the effective value or average value V into a maximum value. Theoretically, to determine the capacitor current ic it is ideal to differentiate the output voltage vo by taking the capacitor current as ic=C×dvo/dt. However, performing the differential calculation using a low-performance calculating device such as CPU and DSP is technically difficult. If one wishes to reproduce the ic as a sinusoidal waveform by calculating a general expression for an AC circuit in real time, the following general expression may be used.

$$ic = Vm \times \omega 0 \times C \times \cos \omega 0 t$$

where Vm is a maximum value of the output voltage vo.

In the method of this invention, the current ic' equivalent to the capacitor current ic is calculated by using expression (2) in place of the above general expression. The output current calculation means 6 uses the current ic' obtained in this way as the capacitor current ic for calculating the output current io=iL−ic'.

With this embodiment, an instantaneous wave form of the capacitor current of the LC filter is obtained by the data and calculation, and is subtracted from the inverter current in real time. The output current is then virtually obtained based on io'≈iL−ic'. In a real test, this method could improve the detection error, which is conventionally about 10–15% at maximum, to 5% or less.

Table 1 below shows inverter output currents io measured by a current transformer and output current values calculated by the device of this embodiment. This result finds that when the output current is large, there is no big difference between the two values because the influence of the capacitor current is small but that when the current is small, the effect of this device is observed.

TABLE 1

| | Calculated output current io' [A] | | | |
|---|---|---|---|---|
| | Conventional | | Invention | |
| Output current | Calculated io' value | Error | Calculated io' value | Error |
| 1.0 | 1.14 | 14.3% | 1.05 | 4.7% |
| 1.5 | 1.56 | 4.0% | 1.53 | 1.7% |
| 2.0 | 1.97 | −1.5% | 1.97 | −1.3% |
| 3.0 | 2.97 | −1.0% | 3.04 | 1.3% |
| 4.0 | 4.05 | 1.3% | 4.04 | 1.0% |
| 5.0 | 5.02 | 0.4% | 4.98 | −0.4% |

The information on the output current io is inverter's load factor information, which is used by a user of the device as load factor information or current value information. Thus, the output current obtained in this invention provides useful information for safe and efficient use of the inverter. This invention is particularly effective when a reproduction of instantaneous waveforms is not so important, for example, when the output current io' is converted into an effective value or average value for measurement purposes.

Further, the present invention is not limited to these embodiments, but various variations and modifications may be made without departing from the scope of the present invention.

What is claimed is:

1. An inverter output current detection method for an inverter, the inverter having an LC filter made up of a reactor and a capacitor at an output side of an inverter circuit and supplying a load with a terminal voltage of the capacitor as an output voltage vo, the detection method detecting as an output current a current io obtained by subtracting a capacitor current ic flowing through the capacitor from a reactor current iL flowing through the reactor, comprising the steps of:

detecting the output voltage vo for obtaining its effective value or average value V;

obtaining cosine wave digital data (cos WaveData) by advancing by 90 degrees a phase of an inverter sine wave data used to obtain the output voltage vo; and digitally calculating a current ic' equivalent to the capacitor current ic by an expression shown below $$ic' = V \times \omega 0 \times C \times [\cos \text{WaveData}] \times K$$

where the ω0 is an angular frequency of the output voltage, the C is a capacitance of the capacitor, and the K is a value obtained by multiplying a detection ratio for detecting the output voltage vo, a conversion ratio for converting an analog value to a digital value and a conversion ratio for converting the effective value or average value V into a maximum value;

using the current ic' equivalent in place of the capacitor curent ic to determine the output current; and outputting the inverter output current.

2. The inverter output current detection method for an inverter according to claim 1, further comprises a step of obtaining the angular frequency ω0 of the output voltage vo from the output voltage.

3. The inverter output current detection method for an inverter according to claim 1, comprising the further step of using the output current to determine one of load factor information and current value information to assist in monitoring operation of the inverter.

4. An inverter output current detection method for an inverter, the inverter having an LC filter made up of a reactor and a capacitor on an output side of an inverter circuit and supplying a load with a terminal voltage of the capacitor as an output voltage, the detection method detecting as an output current a current io obtained by subtracting a capacitor current ic flowing through the capacitor from a reactor current iL flowing through the reactor, comprising the steps of:

detecting the output voltage vo for obtaining its effective value or average value V;

determining an angular frequency ω0 of the output voltage vo from the output voltage;

obtaining in advance cosine wave digital data (cos Wave Data) by advancing by 90 degrees a phase of inverter sine wave data used to obtain the output voltage vo; and digitally calculating a current ic' equivalent to the capacitor current ic according to an expression below $$ic' = V \times \omega 0 \times C \times (\cos \text{WaveData}) \times K$$

where the C is a capacitance of the capacitor, and the K is a value obtained by multiplying a detection ratio for detecting the output voltage vo, a conversion ratio for converting an analog value into a digital value and a conversion ratio for converting the effective value or average value V into a maximum value;

using the current ic' equivalent in place of the capacitor current ic to determine the output current; and outputting the inverter output current.

5. The inverter output current detection method for an inverter according to claim 4, wherein the cos WaveData is stored in a memory in advance.

6. The inverter output current detection method for an inverter according to claim 4, comprising the further step of using the output current to determine one of load factor information and current value information to assist in monitoring operation of the inverter.

7. An inverter output current detection device for an inverter, the inverter having an LC filter made up of a reactor and a capacitor at an output side of an inverter circuit and supplying a load with a terminal voltage of the capacitor as an output voltage, the detection device detecting as an output current a current io obtained by subtracting a capacitor current ic flowing through the capacitor from a reactor current iL flowing through the reactor, comprising:

a voltage calculation means for detecting the output voltage vo and calculating its effective value or average value V;

a data memory means to store in advance cosine wave digital data (cos WaveData) obtained by advancing by 90 degrees a phase of inverter sine wave data used to obtain the output voltage vo; and a capacitor current calculation means to digitally calculate a current ic' equivalent to the capacitor current ic according to an expression below $$ic' = V \times \omega 0 \times C \times (\cos \text{WaveData}) \times K$$

where the ω0 is an angular frequency of the output voltage, the C is a capacitance of the capacitor, and the K is a value obtained by multiplying a detection ratio for detecting the output voltage vo, a conversion ratio for converting an analog value into a digital value and a conversion ratio for converting the effective value or average value V into a maximum value.

8. The inverter output current detection device for an inverter according to claim 7, further comprises an angular frequency calculation means to obtain the angular frequency ω0 of the output voltage vo from the output voltage.

* * * * *